United States Patent
Gaal et al.

(10) Patent No.: US 8,254,512 B2
(45) Date of Patent: Aug. 28, 2012

(54) METHOD AND APPARATUS FOR INCREASING COHERENT INTEGRATION LENGTH WHILE RECEIVING A POSITIONING SIGNAL

(75) Inventors: Peter Gaal, San Diego, CA (US); Christopher Patrick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1397 days.

(21) Appl. No.: 10/991,625

(22) Filed: Nov. 17, 2004

(65) Prior Publication Data

US 2006/0114984 A1    Jun. 1, 2006

(51) Int. Cl.
*H04L 7/00* (2006.01)

(52) U.S. Cl. ........ 375/354; 375/134; 375/136; 375/145; 375/147; 375/149; 375/240; 375/316; 375/340; 375/368; 375/371; 701/400; 701/468; 701/469; 701/470; 701/471; 455/502; 455/509; 455/510; 455/516

(58) Field of Classification Search .................. 375/240, 375/357, 376, 134, 136, 145, 147, 149, 316, 375/340, 354, 368, 371; 455/456.1, 13.2, 455/502, 509, 510, 516; 701/213, 400, 468, 701/469, 470, 471
See application file for complete search history.

(56) References Cited

U.S. PATENT DOCUMENTS

| | | |
|---|---|---|
| 5,841,396 A | 11/1998 | Krasner |
| 6,002,363 A | 12/1999 | Krasner |
| 6,300,899 B1 | 10/2001 | King ........................ 342/357.12 |
| 6,304,216 B1 * | 10/2001 | Gronemeyer ................. 342/378 |

(Continued)

FOREIGN PATENT DOCUMENTS

| | | |
|---|---|---|
| EP | 0561540 | 3/1993 |
| JP | 2001349935 A | 12/2001 |
| JP | 2004518963 T | 6/2004 |
| JP | 2004525362 T | 8/2004 |
| JP | 2007519936 T | 7/2007 |

OTHER PUBLICATIONS

International Search Report—PCT/US05/042000, International Searching Authority—European Patent Office, May 19, 2006.
Written Opinion—PCT/US05/042000, International Searching Authority—European Patent Office, May 19, 2006.

(Continued)

*Primary Examiner* — Leon Flores
(74) *Attorney, Agent, or Firm* — Mary A. Fales

(57) ABSTRACT

A receiving method and apparatus for increasing coherent integration length while receiving a positioning signal from transmitters such as GPS satellites. In order to compensate for frequency drifts that may occur in the positioning signal, a hypothesis is made as to the frequency drift, which is inserted into the receiving algorithm. Advantageously, the length of coherent integration can be increased at the expense of reducing the length of incoherent integration while keeping the total integration length the same, the net effect of which is an increase in signal detection sensitivity. The frequency drift hypothesis has any appropriate waveform; for example, approximately linear or exponential. The hypothesized frequency drift can be inserted into the receiver algorithm in any suitable place; for example, the data block may be adjusted for the hypothesized frequency drift, alternatively the reference signal may be adjusted, or the frequency samples of either the data block or the reference signal may be adjusted.

36 Claims, 7 Drawing Sheets

U.S. PATENT DOCUMENTS

| | | | |
|---|---|---|---|
| 6,311,129 B1 * | 10/2001 | Lin ............................... | 701/472 |
| 6,329,946 B1 | 12/2001 | Hirata et al. | |
| 6,407,699 B1 * | 6/2002 | Yang ....................... | 342/357.59 |
| 6,421,002 B2 | 7/2002 | Krasner | |
| 6,725,157 B1 | 4/2004 | Yu ............................... | 701/213 |
| 6,850,557 B1 * | 2/2005 | Gronemeyer ................. | 375/150 |
| 7,702,002 B2 * | 4/2010 | Krasner ....................... | 375/150 |
| 2002/0105457 A1 | 8/2002 | Dooley et al. ............ | 342/357.05 |
| 2004/0063411 A1 | 4/2004 | Goldberg et al. .......... | 455/192.2 |

OTHER PUBLICATIONS

International Preliminary Report on Patentability—PCT/US05/042000, The International Bureau of WIPO—Geneva, Switzerland, May 22, 2007.

Translation of Office Action in Japan application 2007-543314 corresponding to U.S. Appl. No. 10/991,625, citing JP2001349935, JP2004525362, JP2004518963, JP2007519936 and US6725157 dated Jan. 18, 2011.

* cited by examiner

METHOD AND APPARATUS FOR INCREASING COHERENT INTEGRATION LENGTH WHILE RECEIVING A POSITIONING SIGNAL

BACKGROUND OF THE INVENTION

1. Field of the Invention

This invention relates to apparatus and methods for computing the position of a mobile device by use of wireless positioning signals, such as GPS systems.

2. Description of Related Art

Position location devices are becoming increasingly popular, not only for ships at sea or adventurers in the backcountry, but also for anyone who uses a cell phone in daily life. The increasing number of cell phones, coupled with the popularity of personal position location devices, has encouraged development of rapid, high sensitivity methods for acquiring the signals used to determine position.

Position location technologies typically utilize wireless positioning signals concurrently transmitted from known locations. In GPS systems, these positioning signals are concurrently transmitted from a multiplicity of satellites at a known time, with a predefined frequency. On the ground, a GPS receiver acquires a positioning signal from each satellite within its view of the sky. The times of arrival of the positioning signals along with the exact location of the in-view satellites and the exact times the signals were transmitted from each satellite are used to triangulate the position of the GPS receiver.

Positioning signals, and particularly GPS signals, include high rate repetitive signals, or "codes", called pseudorandom (PN) sequences. The codes available for civilian applications are called C/A codes, and have a binary phase-reversal rate, or "chipping" rate, of 1.023 MHz and a repetition period of 1023 chips for a code period of 1 msec. The pseudorandom sequences in the GPS system belong to a family known as "Gold codes". Each GPS satellite simultaneously broadcasts a signal at a carrier frequency with its unique Gold code.

At a receiver, the electromagnetic energy at the carrier frequency is observed, and this observed energy is processed to search for the possible presence of signals from any GPS satellites that may be in view. At the time of observation by the receiver, the particular GPS code and the phase delay are not known. The object of the receiver is to identify the GPS code(s) in the observed energy about the carrier frequency, and determine the phase delay of each identified GPS code. However, because the GPS code and phase delay is initially unknown, an approach is typically employed in which a first GPS code is hypothesized and a number of phase assumptions are then tested sequentially until the GPS signal has been either identified or determined not to be present. The process is then repeated for each other GPS satellite that may be in view.

Receiving positioning signals from GPS satellites can be difficult due to a number of factors. For example, GPS signals are transmitted at relatively low power, and from a great distance. By the time the GPS signals travel from earth orbit to a receiver, their initially low power has been greatly reduced, rendering the signal extremely weak at the receiver.

Another problem relates to frequency errors that can affect one or more of the positioning signals. For example, the carrier frequency may shift slightly over time due to Doppler effects. In the receiver, the oscillators and other electronic devices that receive and process the signal can introduce errors such as slight shifts in frequency, which can complicate reception. If the frequency shift is constant, a Fourier transform (e.g., an FFT) approach can be used; however, further complications result when this frequency shift varies over time; i.e., when the frequency shift is not constant over the observation time (the data block). In order to address the problem of time-varying frequency errors, the length of the data block for coherent processing (coherence length) is usually limited to a fraction of a second (e.g., 20 milliseconds); otherwise, the frequency errors could greatly degrade the system sensitivity. In order to increase the system sensitivity in the possible presence of frequency shifts, a number of successive coherent processing operations may be done for a number of time periods (e.g., five to twenty), and the results are added together non-coherently to provide an indication of the signal over periods of one second or more. It would be a significant advantage if there were a system available that could perform a single coherent processing operation over longer periods of time; i.e., if the coherent integration length could be significantly increased.

SUMMARY OF THE INVENTION

A method and apparatus are described herein for increasing the coherent integration length for receiving and processing one or more positioning signals transmitted from a plurality of transmitters at predetermined frequencies, which are used in determining a location of a receiver. Each positioning signal includes a periodically-repeating sequence that uniquely identifies the transmitter that sent the signal.

In order to compensate for frequency drifts that may occur in the positioning signal after observation and processing in a receiver, one or more hypotheses are made as to the frequency drift, which, in one embodiment, are then combined with observed data and processed. This allows a longer coherent integration length, which can significantly reduce processing time and/or provide a more accurate result. Particularly, by applying frequency drift hypotheses in the signal processing, the length of coherent integration can be increased at the expense of reducing the length, of incoherent integration while keeping the total integration length the same, the net effect of which is an increase in signal detection sensitivity.

Particularly, a method and apparatus is disclosed that utilizes a long coherent integration period to receive a positioning signal transmitted from one of a plurality of transmitters at a predetermined carrier frequency. The positioning signal includes a reference signal that uniquely identifies the transmitter that sent the positioning signal. The method comprises observing electromagnetic energy at about the carrier frequency at a receiver, and storing data indicative of the observed electromagnetic energy. The data is observed over a predefined period of time to define a data block that may be subject to an unknown frequency drift. One of the transmitters is hypothesized, thereby hypothesizing one of the plurality of unique reference signals. A frequency drift is hypothesized, and responsive to the hypothesized frequency drift, the receiver searches for a match between the data block and the hypothesized reference signal over a plurality of phase shifts. If a matched signal is found, then the receiver determines phase delay and timing information, otherwise the receiver repeatedly loops through the previous steps until a matched signal is found or until predetermined exit criteria has been met.

The hypothesized frequency drift has any appropriate signal form; for example, the hypothesized frequency drift may be approximately linear, or approximately exponential, or more complex. The hypothesized frequency drift can be implemented into the receiver algorithm in any suitable location; for example, the method may include processing the data block responsive to the hypothesized frequency drift to provide a drift-adjusted data signal; and searching for a match between the drift-adjusted data block and the hypothesized reference signal. Alternatively the method may include processing the hypothesized reference signal responsive to the hypothesized frequency drift to provide a drift-adjusted reference signal, and searching for a match between the data block and the hypothesized reference signal.

The receiving method may include calculating frequency samples responsive to the data block, calculating frequency samples responsive to the reference signal, and searching for a match between the frequency samples of the data block and the reference signal. In such an embodiment, the method may further comprise adjusting the vector basis of at least one of the data block frequency samples and the periodically repeating sequence responsive to the hypothesized frequency drift.

Advantageously, the disclosed method allows a longer coherent integration period, thereby using a longer data block than conventional receiver methods. For example, the data block may have a size within a range of one hundred to five hundred repetitions of the reference signals, or within a range of one hundred milliseconds to one second. However, it may still be advantageous to utilize the disclosed method with shorter coherent integration periods, for example ten to one-hundred milliseconds.

In one embodiment the transmitters comprise a plurality of GPS satellites that transmit GPS signals at a GPS frequency, each GPS satellite transmitting a unique periodically-repeating sequence. The signal's code phase offset at the receiver is found, and using this information from a number of transmitters, the receiver's position may be fixed using GPS algorithms.

The above method may be implemented in suitable hardware and/or software in the receiver, and/or on one or more servers in the wireless network. For example, some functions may be implemented in the receiver, and some functions may be implemented in a position determination entity (PDE).

BRIEF DESCRIPTION OF THE DRAWINGS

For a more complete understanding of this invention, reference is now made to the following detailed description of the embodiments as illustrated in the accompanying drawings, wherein.

DETAILED DESCRIPTION

Figure 1:
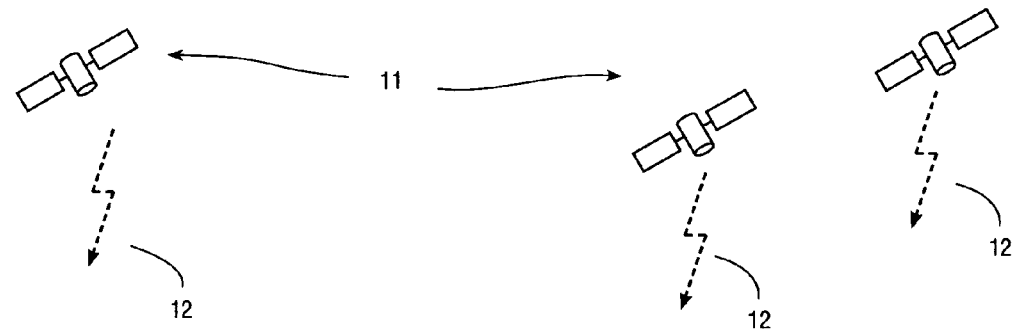
FIG. 1 is a perspective view of a communication and position location system that includes satellites emitting GPS signals, which are received by a GPS receiver in a mobile station, that is in communication with a plurality of base stations.
Figure 1:
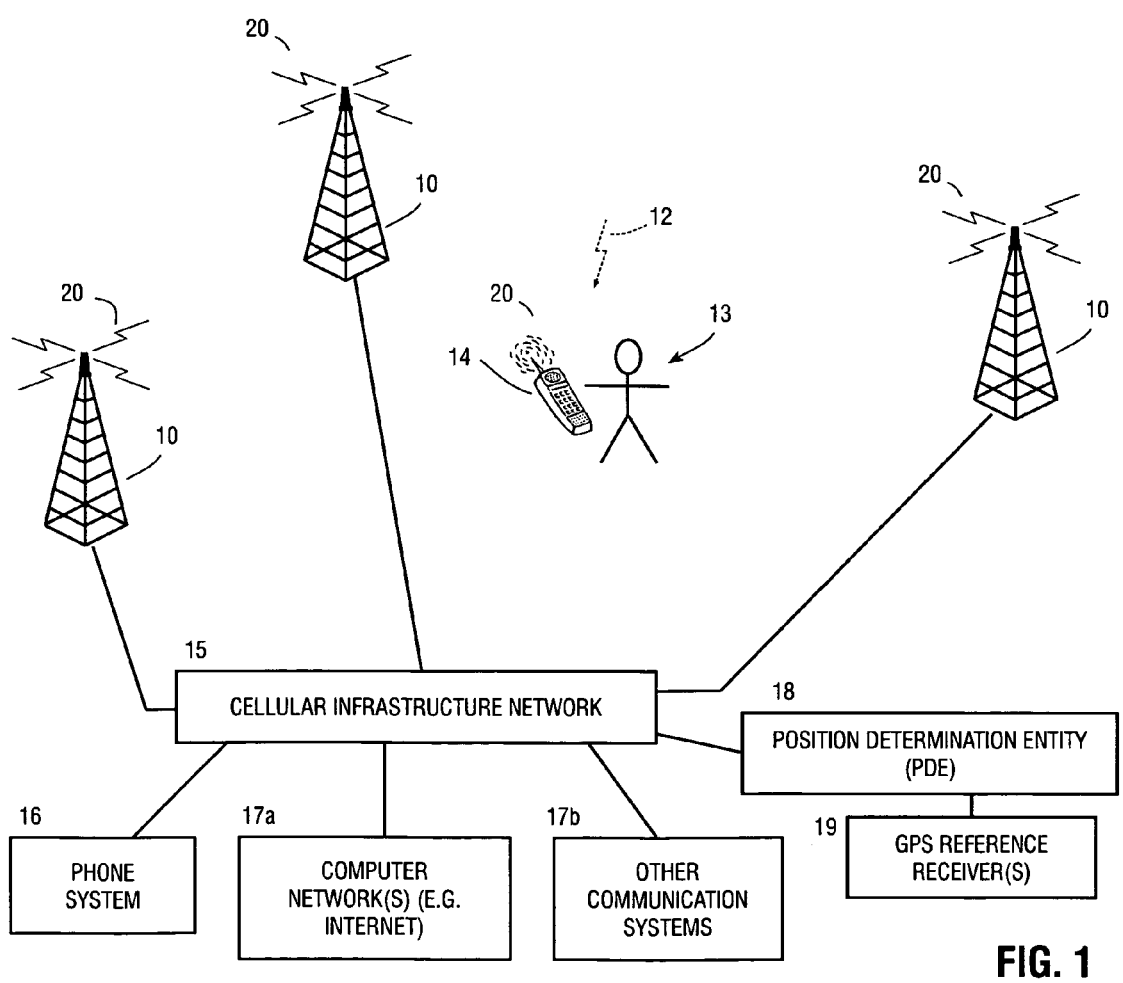

This invention is described in the following description with reference to the Figures, in which like numbers represent the same or similar elements.

The FFT and DFT algorithms discussed herein are used to illustrate examples of algorithms that generate frequency samples. More generally, any suitable algorithm that generates appropriate frequency samples may be utilized as an alternative to the FFT and DFT algorithms. For example, the frequency samples may be generated using a DFT-like algorithm where the number and spacing of the frequency domain samples is not exactly that of a DFT; i.e., more or less frequency samples may be computed, and the spacing between the frequency domain samples may be narrower than that of a standard DFT operation. The frequency samples may be generated from digital or analog data, from observed data, or from previously calculated values. The calculated frequency samples are then used for subsequent operations.

Glossary of Terms and Acronyms

The following terms and acronyms are used throughout the detailed description:

A-GPS: Assisted GPS. A location technology in which special assistance to the GPS acquisition process is provided by a location server, which can reduce acquisition time and improve sensitivity.

Base Station or BTS: Base Transceiver Station. A fixed station used for communicating with mobile stations. Includes antennas for transmitting and receiving wireless communication signals.

CDMA: Code Division Multiple Access. A high-capacity digital wireless technology that was pioneered and commercially developed by QUALCOMM™ Incorporated.

Chip: A symbol, also the smallest part of a modulation (e.g., a phase reversal) of a pseudorandom (PN) sequence.

Chip rate: Symbol transmission rate.

Code phase: The relative timing between a frame boundary of a received PN sequence contained within a received GPS signal and the frame boundary of a locally-generated PN reference sequence. The code phase is normally a number that is between zero and the duration of one PN frame; i.e., one millisecond in the civilian GPS signal. Code phase may be considered the timing information extracted by the receiver that is used to determine position.

Coherent Processing: The technique of processing a data block as a whole, usually without the use of nonlinear (e.g., detection or combining) operations.

Correlation: The process of comparing a received signal and a reference code. Correlation operations include coherent processing and may also include incoherent processing. The output of any correlation process (coherent or incoherent) is termed a "correlation output."

Detection: The process of operating upon a set of samples by use of a nonlinear operation, typically a magnitude or a magnitude-squared operation, to determine the power in each data sample. For example, if each data sample is represented in an in-phase and quadrature (I-Q) component format, or in a "complex" format in which the in-phase component is associated with the real component of a data word and the quadrature component is associated with the imaginary component, then the detection process may calculate the magnitude or magnitude-squared. In one case, the magnitude-squared operations are normal operations associated with complex numbers.

DFT: Discrete Fourier Transform.

FFT: Fast Fourier Transform. An efficient technique for calculating the DFT of finite-duration sequences. Note that the frequency samples constructed from a DFT or an FFT algorithm are identical, and we may use the terminology "DFT data" and "FFT data" interchangeably.

GPS: Global Positioning System. A technique utilizing distance measurements to GPS satellites to determine three-dimensional location (including altitude). Although the term GPS is often used to refer to the U.S. Global Positioning System, the meaning of this term includes other global positioning systems, such as the Russian Glonass System and the planned European Galileo System. In some systems, the term Satellite Positioning System (SPS) is used in substitution for the GPS terminology. For illustrative purposes, the invention herein is described in terms of the current U.S. GPS System. It should be obvious, however, to one skilled in the art that this invention may be applied to a variety of SPS systems that utilize similar signaling formats, as well as to future variations of the U.S. GPS System.

GPS fix: The end result of a process of measurements and subsequent computations by which the location of the GPS user is determined.

GSM: Global System for Mobile, another widely-used digital wireless technology.

Incoherent Processing: Combining several adjacent coherently-processed data sets by performing a nonlinear detection operation, followed by a combining operation, for reasons such as to improve the signal-to-noise ratio. For example, incoherent processing may include detecting and combining (e.g., summing) correlation outputs from multiple adjacent data blocks.

MS: Mobile Station, such as a cell phone that has a baseband modem for communicating with one or more base stations, and position location capabilities. MS's referenced in this disclosure typically include a GPS receiver.

PDE: Position Determination Entity. A system resource (e.g., a server) typically within the CDMA network, working in conjunction with one or more GPS reference receivers, capable of exchanging GPS-related information with an MS. In an MS-Assisted A-GPS session, the PDE can send GPS assistance data to the MS to enhance the signal acquisition process. The MS can return information such as pseudorange measurements back to the PDE, which is then capable of computing the position of the MS. In an MS-Based A-GPS session, the MS can send computed position results to the PDE.

Pseudorange measurement: A process employed by GPS receivers and based on signal processing techniques to determine the distance estimate between the receiver and a selected satellite. The distance is measured in terms of signal transmission time from the SV to the receiver.

SV: Satellite Vehicle. One major element of the Global Positioning System is the set of SV's orbiting the Earth and broadcasting uniquely identifiable signals.

UMTS: Universal Mobile Telephone Service: A third generation cellular standard utilizing a form of CDMA, designed to be the successor to GSM.

Overview of GPS System and Mobile Station

Figure 2:
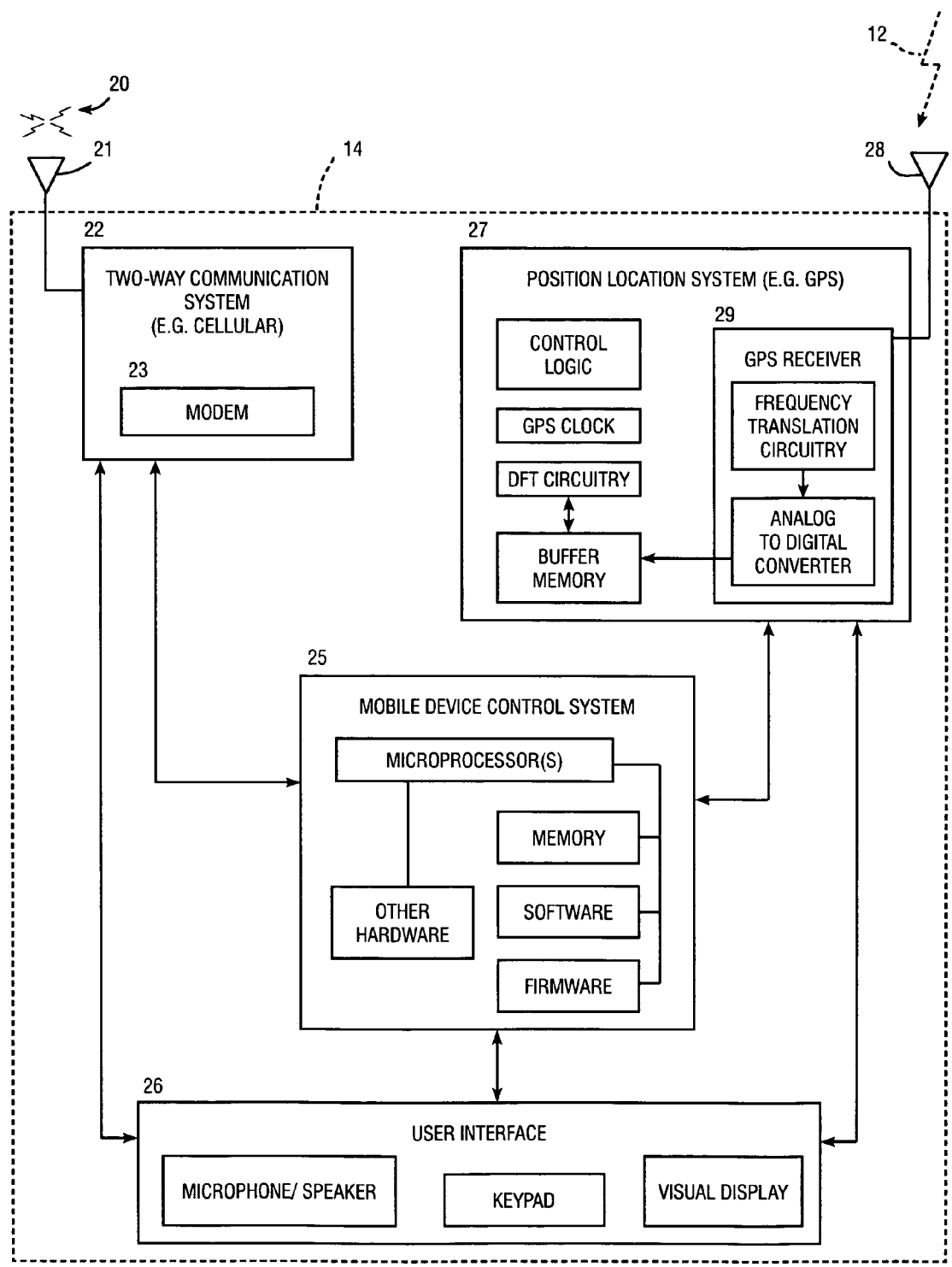
FIG. 2 is a block diagram of one embodiment of a mobile station, including a GPS receiver and a cellular communication system.

Reference is now made to FIGS. 1 and 2. FIG. 1 illustrates a GPS environment that includes a plurality of GPS satellites (SV's) 11 that emit GPS positioning signals 12, a plurality of land-based base stations 10, and a mobile station (MS) 14. The base stations 10 are connected to a cellular infrastructure network 15, which allows it to communicate with other networks and communication systems, such as a phone system 16, computer networks 17*a* such as the internet, and other communication systems 17*b*. Thus the base stations 10 may comprise part of a communication network that may include a number of additional communication systems in communication with the base stations.

The MS 14 is described elsewhere herein, for example with reference to FIG. 2, but generally includes a GPS receiver and a two-way communication system for communication with the base stations using two-way communication signals 20. It should be apparent that the GPS receiver could be implemented in a wide variety of mobile stations (other than cell phones) that communicate with one or more base stations. Furthermore, for ease of description herein, the position location system disclosed herein may be a GPS system; it should be recognized that the system described herein could be implemented in any satellite-based positioning systems.

In FIG. 1, a user 13, on foot, is illustrated holding the MS 14. The user may be standing, walking, traveling in a car, or on public transportation, for example. It should be apparent that the mobile station may be positioned in a wide variety of environments, and may be stationary or moving.

The GPS satellites (SV's) 11 comprise any group of satellites broadcasting signals that are utilized for positioning a GPS receiver. Particularly, the satellites are synchronized to send wireless positioning signals 12 phased to GPS time. These positioning signals are generated at a predetermined frequency, and in a predetermined format. In a current GPS implementation, each SV transmits a civilian type of GPS signal on the L1-frequency band (at 1575.42 MHz) in a format that is in accordance with GPS standards. When the GPS signals are detected by a conventional GPS receiver in the MS, the GPS system attempts to calculate the amount of time elapsed from transmission of the GPS signal until reception at the MS. In other words, the GPS system calculates the time required for each of the GPS signals to travel from their respective satellites to the GPS receiver. The pseudo range is defined as: $c \cdot (T_{user} - T_{sv}) + cT_{bias}$, where c is the speed of light, $T_{user}$ is the GPS time when the signal from a given SV is received, $T_{sv}$ is the GPS time when the satellite transmitted the signal and $T_{bias}$ is an error in the local user's clock, normally present in the GPS receiver. Sometimes pseudorange is defined with the constant "c" omitted. In the general case, the receiver needs to resolve four unknowns: X, Y, Z (the coordinates of the receiver antenna), and $T_{bias}$. For this general case, resolving the four unknowns usually requires measurements from four different SV's; however, under certain circumstances, this constraint can be relaxed. For example, if an accurate altitude estimate is available, then the number of SV's required can be reduced from four to three. In so-called assisted GPS operation, $T_{sv}$ is not necessarily available to the receiver and instead of processing true pseudoranges, the receiver relies primarily upon code phases. In a current GPS implementation, the code phases have one-millisecond time ambiguities, since the PN codes repeat every one millisecond. Sometimes the data bit boundaries may be ascertained, thus producing only 20-millisecond ambiguities.

The base stations 10 comprise any collection of base stations utilized as part of a communication network that communicates with the MS 14 using wireless signals 20. The base stations are connected to the cellular infrastructure network 15 that provides communication services with a plurality of other communication networks such as a public phone system 16, computer networks 17*a* such as the internet, a position determination entity (PDE) 18 (defined above), and a variety of other communication systems shown collectively in block 17*b*. A GPS reference receiver (or receivers) 19, which may be in or near the base stations 10, or in any other suitable location, communicates with the PDE 18 to provide useful information in determining position, such as SV position (ephemeris) information.

The ground-based cellular infrastructure network 15 typically provides communication services that allow the user of a cell phone to connect to another phone over the phone system 16; however the base stations could also be utilized to communicate with other devices and/or for other communication purposes, such as an internet connection with a hand-held personal digital assistant (PDA). In one embodiment, the base stations 10 are part of a GSM communication network; however, in other embodiments other types of synchronous (e.g., CDMA2000) or asynchronous communication networks may be used.

FIG. 2 is a block diagram of one embodiment of the mobile device 14, which includes communication and position location systems. A cellular communication system 22 is connected to an antenna 21 that communicates using the cellular signals 20. The cellular communication system 22 comprises suitable devices, such as a modem 23, hardware, and software for communicating with and/or detecting signals 20 from base stations, and processing transmitted or received information.

A GPS position location system 27 in the MS is connected to a GPS antenna 28 to receive positioning signals 12 that are transmitted at or near the ideal GPS (carrier) frequency. The GPS system 27 comprises a GPS receiver 29 that includes frequency translation circuitry and an analog-to-digital converter, a GPS clock, control logic to control the desired functions of the GPS receiver, and any suitable hardware and software for receiving and processing GPS signals and for performing any calculations necessary to determine position using any suitable position location algorithm. In the illustrated embodiment, the analog to digital converter is connected to the buffer memory in the position location system, and a buffer memory is coupled to the DFT circuitry to provide and store the data during the DFT operation. In some assisted GPS implementations the final position location calculations (e.g., latitude and longitude) are performed at a remote server, based upon code phases and other information sent from the GPS receiver to the remote server. Some examples of GPS systems are disclosed in U.S. Pat. Nos. 5,841,396, 6,002,363, and 6,421,002, by Norman F. Krasner.

The GPS clock is intended to maintain accurate GPS time; however, since most often accurate time is not available before a location fix, it is common practice to maintain time in the GPS clock software by its estimated value and an uncertainty associated with that value. It may be noted that after an accurate GPS location fix, the GPS time will often be known precisely (within a few tens of nanoseconds uncertainty in the current GPS implementations). However, when the final position location calculation is done at a remote server, the precise time may only be available at the server.

A mobile device control system 25 is connected to both the two-way communication system 22 and the position location system 27. The mobile device control system 25 includes any appropriate structure, such as one or more microprocessors, memory, other hardware, firmware, and software to provide appropriate control functions for the systems to which it is connected. It should be apparent that the processing steps described herein are implemented in any suitable manner using hardware, software, and/or firmware, subject to control by the microprocessor.

The control system 25 is also connected to a user interface 26, which includes any suitable components to interface with the user, such as a keypad, a microphone/speaker for voice communication services, and a display (e.g., a backlit LCD display). The mobile device control system 25 and user interface 26, connected to the position location system 27 and two-way communication system 22, provide suitable input-output functions for the GPS receiver and the two-way communication system, such as controlling user input and displaying results.

GPS Signal Description

Figure 3:
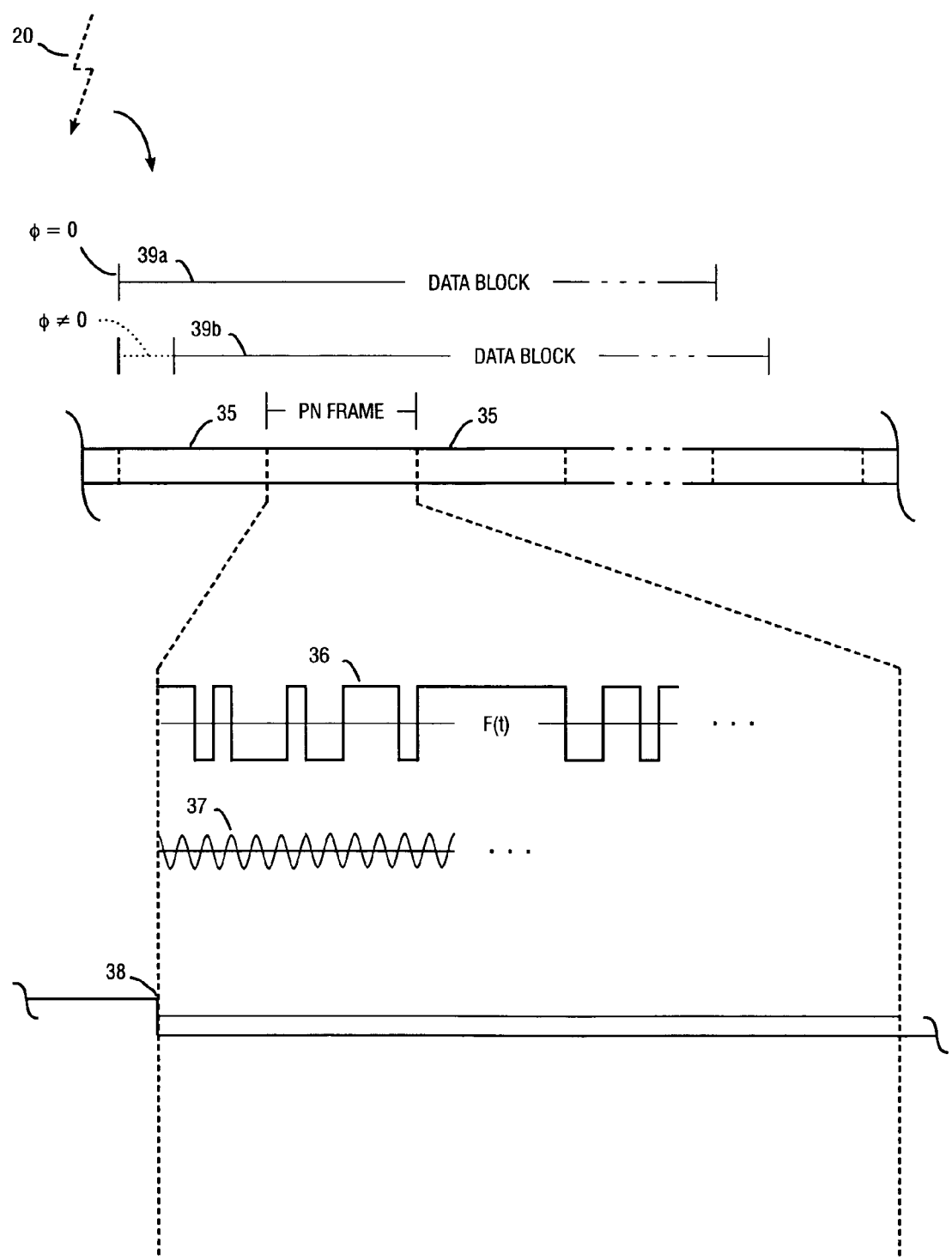
FIG. 3 is a diagram that illustrates the structure and waveform components of a GPS positioning signal.

Reference is made to FIG. 3, which is a diagram that represents the structure of an ideal GPS signal described in equation (A1). The functional form of a GPS signal can be represented at any time t as follows:

$$s(t) = Ad(t)P(t)e^{j2\pi f w_r(t) dt + \phi} \quad (A1)$$

where A is the signal amplitude, d(t) is a relatively low rate (e.g., 50 baud) data sequence that modulates the carrier (e.g., by bi-phase modulation), P(t) is the waveform consisting of a repeating PN sequence F(t), $\emptyset$ is the carrier phase, and $w_r(t)$ is the instantaneous received carrier frequency:

$$w_r(t) = w_e(t) + w_c \quad (A2)$$

where $w_e(t)$ is the instantaneous frequency error (frequency drift), and $w_c$ is the nominal carrier frequency.

It may be noted that equation (A1) is a complex representation, which can be useful if quadrature sampling methods are utilized to process the signal; of course other representations may be used as appropriate. In real world situations it should be recognized that the various parameters are not completely stable.

As shown in FIG. 3, the GPS signal comprises a series of PN frames shown at 35, each including a waveform F(t) 36 that is bi-phase modulated according to a particular pseudonoise (or "PN") sequence and a carrier frequency 37. An individual repetition of F(t) is termed a "PN frame." Each PN frame has a predetermined period $T_r$. At 38, a data transition of the data sequence d(t) is shown occurring at the start of one of the illustrated PN frames; however, because the data sequence d(t) has a relatively low rate, the data transition 38 will happen only once per 20 PN frames and therefore the data transition may or may not occur at the start of an arbitrarily-chosen PN frame.

Each GPS satellite (SV) transmits a unique PN waveform F(t) shown at 36, which is a series of symbols (chips) transmitted at a predetermined rate. The PN waveforms are distinguished from one another by the particular PN sequence used to biphase modulate the carrier. For example, these sequences are chosen from a set of Gold codes, in C/A waveforms of the U.S. GPS system. In the following description, the terminology "PN sequence" may be used for F(t), which is not strictly correct, since the PN sequence is actually the sequence of numbers that is used to construct the modulating signal of a carrier, thus producing the waveform F(t). However, it will be clear from the context that "PN sequence" used in this manner means a waveform modulated by the PN sequence.

In one example, the chip rate is 1.023 MHz and hence the PN frame rate would be 1 kHz. This waveform F(t) is repeated continually; for example a first code from a first satellite $SV_1$ repeatedly transmits the unique sequence $F_1(t)$, $SV_2$ repeatedly transmits the unique PN sequence $F_2(t)$, and so forth. The GPS receiver is programmed with the unique PN sequences for all GPS satellites that may be in-view.

These PN sequences are used in an algorithm to identify the specific satellite; particularly, when a satellite signal is received in a GPS receiver, the PN sequence is utilized to identify the satellite that transmitted the received signal. However, initially, the GPS receiver does not know the actual received code phase epoch, which as described above, may range over a full PN frame (e.g., a period of one millisecond or 1023 chips). Hence the receiver must search, either serially or in parallel, over the epoch-uncertainty range in an attempt to align the epoch of a received GPS frame with that of a locally-generated reference frame.

Receiver for GSP Positioning Signals

Figure 4:
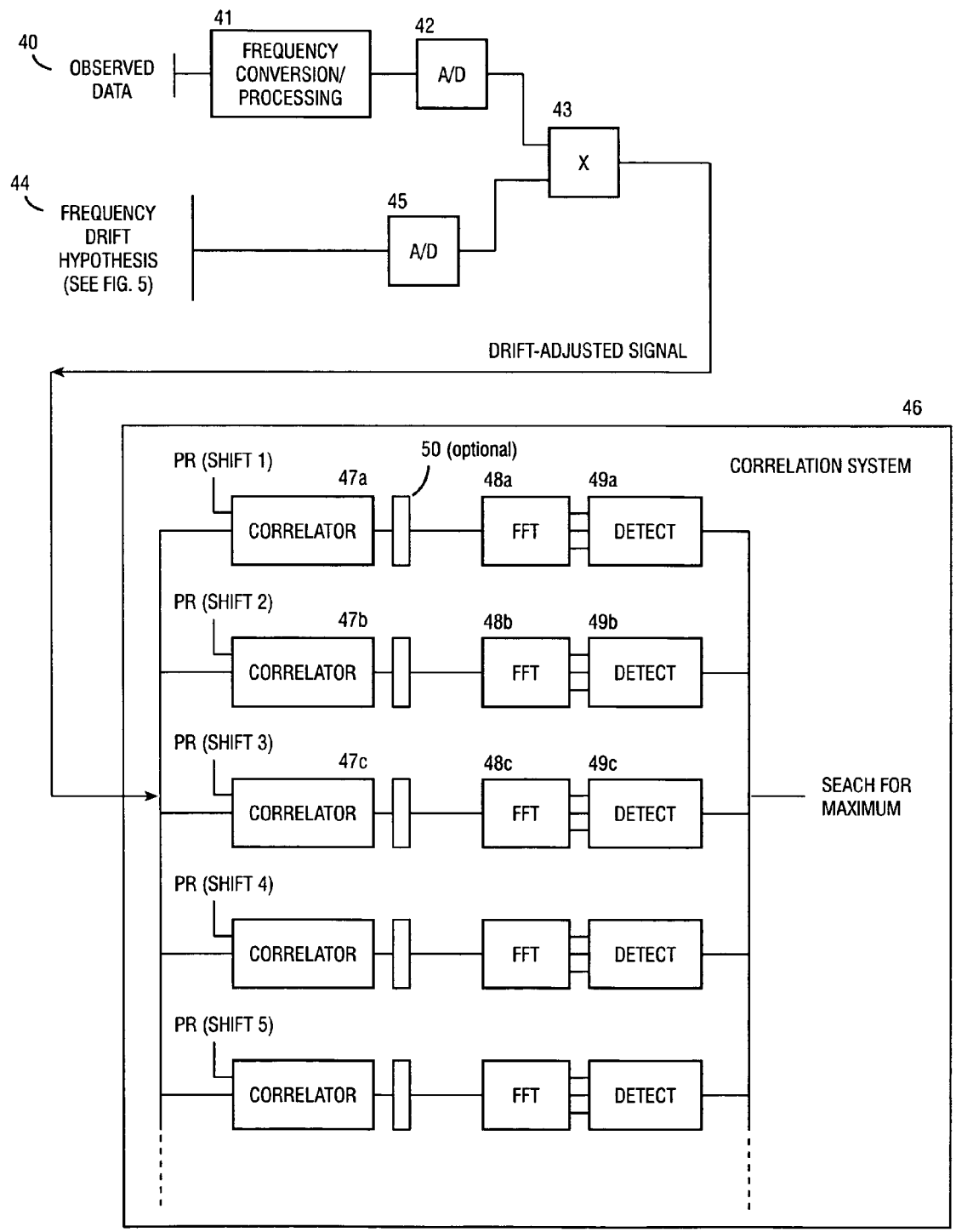
FIG. 4 is a functional block diagram of the portion of a GPS receiver that processes and correlates a received signal to determine if a GPS positioning signal is present.

Reference is now made to FIG. 4, which is a functional diagram of a portion of a GPS receiver that processes and correlates a received signal to determine if a GPS signal is present.

The observed data is shown at 40. It should be first noted that, in an actual GPS environment, the GPS receiver simultaneously receives a multiplicity of signals like the theoretical signal specified in equation (A1), each having a unique PN sequence F(t). For example, in a typical situation, the GPS receiver typically receives eight to twelve signals from a variety of in-view satellites at any time, and the various parameters differ from one another due to differing path lengths, directions of arrival, and Doppler frequency shifts, for example. Therefore the "observed data" may include information from all of the in-view satellites. For purposes of illustration, the following disclosure discusses processing the observed data to search for a signal from a selected satellite; it should be apparent that processing the observed data for the other satellites that may be in-view would proceed in similar manner.

The observed data is then processed at 41, such as by appropriate frequency conversion systems, to take the observed data and convert it to the appropriate frequency, such as by down-conversion. As appropriate, an analog/digital converter 42 may be used to convert the frequency-converted output into digital form for subsequent processing. Of course, if the signal has already been converted to a digital format, then this A/D converter 42 would not be needed. The signal from the A/D converter 42 is then applied to processing box 43, where it is combined with the waveform of the frequency drift hypothesis, such as by multiplication.

After the GPS signals reach the receiver and have been processed in the receiver, the frequency may have drifted from its original value. Frequency drifts may be caused before the signal even arrives at the receiver due to Doppler effects from the motion of the SV and that of the MS. Also, slight errors in the MS local oscillator, such as by temperature changes, can also cause the carrier frequency to vary from its ideal frequency. This frequency drift may vary over time; that is, the frequency drift may change during the time the data is being observed. Typically the amount of frequency drift is unknown to the receiver.

In order to compensate for the unknown frequency drift, a frequency drift hypothesis is made at 44. The predicted frequency drift due to the radial acceleration of the transmitter/satellite (i.e., the predicted satellite Doppler change) may or may not be included in the frequency drift hypothesis. The hypothesized frequency drift generally follows the form:

$$\text{hypothesized frequency drift} = w_h(t) \quad (A3)$$

Figure 5:
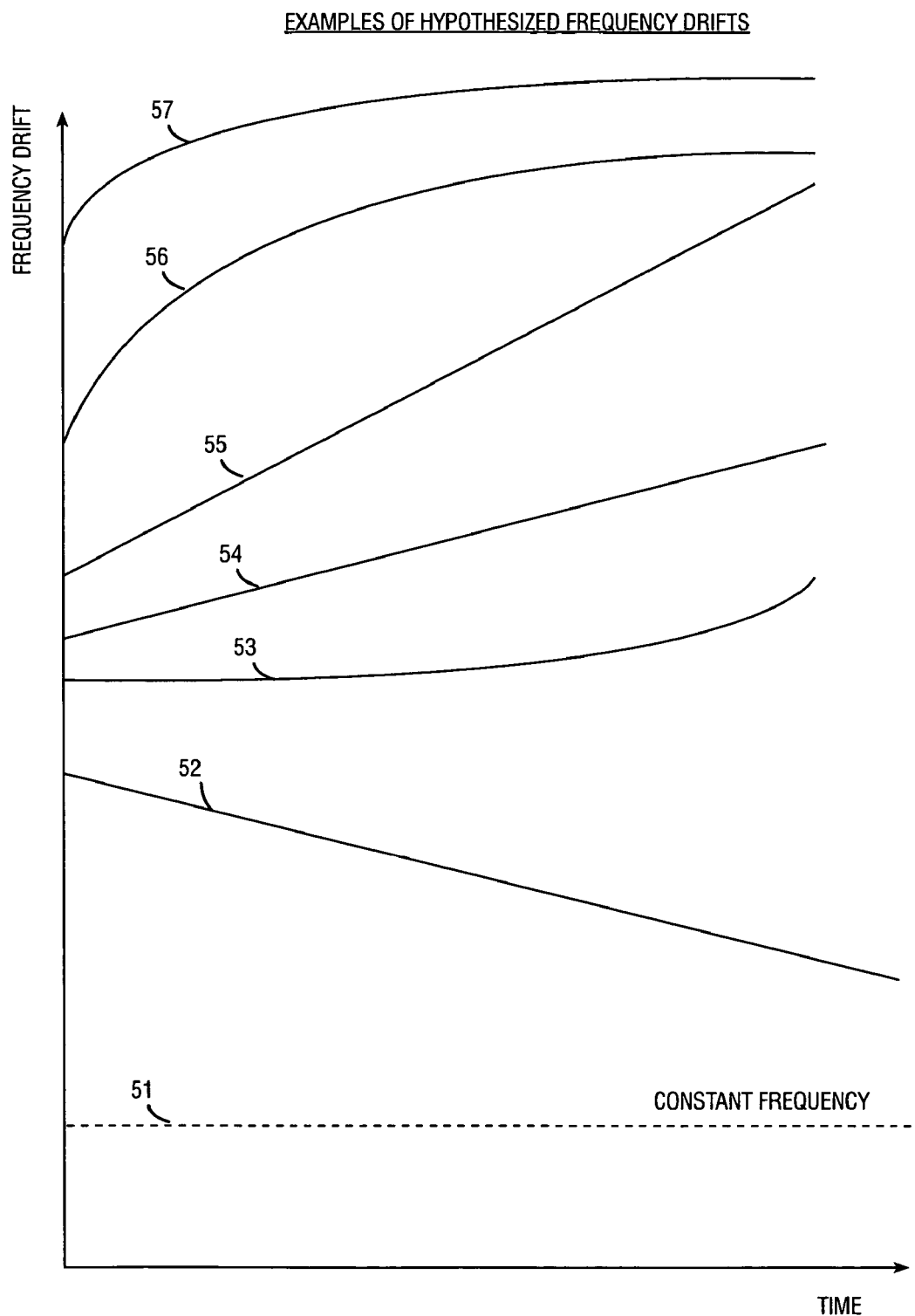
FIG. 5 is a graph of frequency drift vs. time, illustrating a number of examples of frequency drift.

Reference is now made to FIG. 5, which is a graph of frequency drift vs. time that shows a number of examples of frequency drift. It should be apparent that the illustrated hypotheses are only examples, and the hypothesized frequency drift can have a large variety of forms. One example is a constant frequency drift shown at 51. Another example is a negative linear rate of change of frequency drift shown at 52 (e.g., −2 Hz/sec. Another example is an exponential rate of change of frequency drift shown at 53. Still other examples are the positive linear rates of change of frequency drift shown at 54 and 55 (e.g., 1 Hz/sec and 2 Hz/sec). Other examples are the curves shown at 56 and 57. It should be apparent that a limitless number of functions can be used for the frequency drift hypothesis; however a simple hypothesis such as a linear rate of change (positive or negative) may be more straightforward to implement. Also, typically the rate of frequency drift of the actual signal is gradual (e.g., less than 3 Hz/sec), and therefore a frequency drift hypothesis within that range would be likely to improve the reception. Note that the predicted frequency drift due to the radial acceleration of the transmitter/satellite (i.e., the predicted satellite Doppler change) may or may not be included in the frequency drift hypothesis. If the satellite Doppler change is not included in the frequency drift hypothesis then it can be compensated for separately.

The frequency hypothesis can be stored in any appropriate form. For example the frequency hypothesis can be stored as a waveform in memory, in digital form. Alternatively, it could be stored in analog form.

Referring again to FIG. 4, the frequency hypothesis at 44 is applied to an A/D converter 45 (if appropriate) and then combined with the data from the A/D converter 42 by an appropriate method to provide a drift-adjusted signal. For many uses, a multiplication operation would be appropriate to combine the two signals. In some embodiments, the hypothesized frequency drift could be implemented in other parts of the position location system; for example, the hypothesized frequency drift may be used to adjust the reference code rather than the collected data. Since the reference code and the data are used together in correlation, the net effect of adjusting the reference code would be similar to the effect of adjusting the data as illustrated herein. In yet another embodiment, the hypothesized frequency drift may be used to adjust the vector basis of the subsequent FFT operation, or to modify the input or output, or both, of the FFT operation.) The predicted frequency drift due to the motion of the transmitter/satellite (i.e., predicted satellite Doppler change) may be included in the hypothesized frequency drift, or it may be applied separately. In the latter case, the adjustment for the satellite Doppler may be inserted at either the same place in the algorithm as the adjustment for other frequency drifts, or at some other place.

The drift-adjusted signal is then applied to a correlation system 46 that searches for a match with a selected positioning signal and phase delay, responsive to the drift-adjusted signal. The particular correlation system 46 shown in FIG. 4 is provided for purposes of illustration, other embodiments may utilize other correlation systems as appropriate and/or useful. Particularly, in FIG. 4, the correlation system 46 includes a number of processing branches that operate in parallel for faster processing time. However, in practice, the cost of the branches for all possible PR shifts is not usually justified by the time savings, and usually the operations are performed serially, as in a loop.

Correlation System

Typically, to receive a positioning signal from a GPS satellite, the observed signal is correlated with a reference code for the particular GPS code and phase. For example, a correlation receiver may multiply the received signal by a locally-generated reference code containing a stored replica of the appropriate Gold code contained within its local memory, and then integrate (e.g., lowpass filter) the product in order to obtain an indication of the presence of the signal. This process is termed coherent processing.

In FIG. 4, the correlation system 46 includes a first correlator 47a that receives both the drift-adjusted signal and a first pilot reference (PR) signal. The correlated signal is applied to a Fourier transform block 48, and then a detection operation 49 is performed to provide a magnitude that can be compared. A second correlator 47b also receives the drift-adjusted signal, but receives a second PR signal, which has been shifted in phase from the first PR signal. An FFT is performed at 48b and a detection operation is performed at 49b so that the magnitudes are now available. Likewise, a correlation is performed for the third, fourth, fifth PR signal, and so on for all possible phase shifts. Then, the maximum is chosen from these results, and if this maximum is sufficiently above the other results (as determined by predetermined criteria), then it may be selected to be a match, and indicate a phase delay.

In some correlation systems, the results of multiple successive coherent processing operations are detected (e.g., their magnitudes are determined) and combined in order to provide a correlation output with higher fidelity. The initial correlation operations are called "coherent processing" and the latter combining step is called "noncoherent" or "incoherent" processing. With the longer coherent processing times contemplated by the system defined herein, it may not be necessary to perform the incoherent processing, although it may be useful or desirable in some circumstances. Advantageously, the longer coherence length provided by the system disclosed herein can reduce the number of non-coherent integrations required for achieving the required sensitivity. At 50, an optional system is implemented for "chopping"; i.e., the result of the correlation is chopped, and the chopped pieces (time periods) go into the FFT system. In this case, the detect operation at 49a includes squaring of the FFT results and non-coherently summing them across the time periods.

Summary of Correlation System

By sequentially re-adjusting the relative timing of this stored replica relative to the received signal, and observing the correlation output, the receiver can determine the time delay between the received signal and a local clock. This time delay, modulo the code period (e.g., 1 millisecond), is termed the "code phase." The initial determination of the presence of such an output is termed "acquisition." In certain GPS receivers, once acquisition occurs, the process enters the "tracking" phase in which the timing of the local reference is adjusted in small amounts in order to maintain a high-correlation output. The correlation output during the tracking phase may be viewed as the GPS signal with the pseudorandom code removed, or, in common terminology, "de-spread." This signal is narrowband, with bandwidth commensurate with a 50-bit per second (bps) binary-phase-shift-keyed data signal that is superimposed on the GPS waveform.

Method

Figure 6:
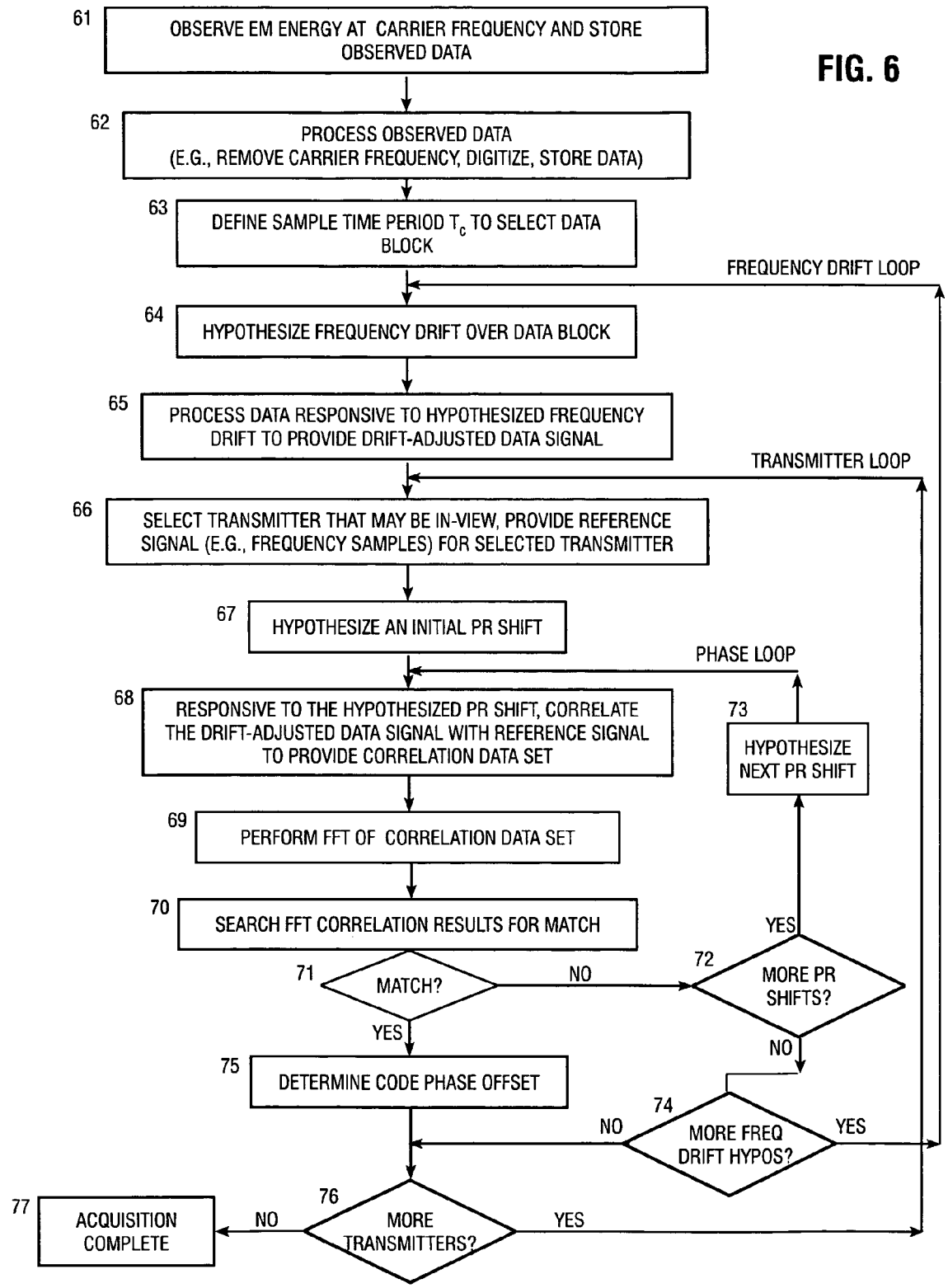
FIG. 6 is a flow chart of a method for received a positioning signal that includes adjusting the data block responsive to a hypothesized frequency drift.

FIG. 6 is a flow chart that shows a series of steps performed in a mobile station to process a positioning signal to identify whether or not it matches a hypothesis that selects a frequency drift, a repeating code that identifies a transmitter, and a carrier frequency offset. As will be described, the algorithm makes a frequency drift hypothesis, it selects a transmitter (e.g., GPS satellite or base station) and it may examine all possible code phase offsets (e.g., 1023 offsets for GPS) to attempt to find a code phase offset match for a selected GPS code. The coherent processing algorithm then is repeated for a number of frequency drift hypotheses, and then repeated again for each GPS code that may be viewable by the mobile station.

Observe Data (61)

In FIG. 6, at 61, an operation is indicated to observe the electromagnetic (EM) energy at about the carrier frequency of a GPS positioning signal. The GPS signal (if present) is observed continuously over a period of time at least as long as a block period $T_c$. The form of a GPS signal is discussed elsewhere herein, for example with reference to FIG. 6.

Process Observed Data (62)

Referring again to FIG. 6, at 62, the observed data is processed as appropriate. The processing may be done in "real-time", by processing data as it is received, for example on a chip-by-chip basis, or the data may be buffered and then processed together as a set. Processing may include removing a carrier frequency from the GPS signal by suitable frequency translation circuitry, leaving a residual frequency $f_e$. In order to remove the carrier frequency, the GPS signal is typically first converted to an intermediate frequency (IF) by a mixer. Then the converted GPS signal is processed to reduce the remaining IF component to approximately zero by any suitable analog or digital technique; for example, the IF frequency can be approximately removed by another mixer, or after converting the GPS to a digital signal in the analog-to-digital converter, digital processing mixing techniques may be used. This may be done for example with conventional local oscillators and mixers, in a manner well known in the art. In addition, although the carrier frequency may be removed prior to digitization, it is possible that only the bulk of the carrier frequency may be removed and that the signal is the frequency translated to a low IF frequency, say $f_{IF}+f_e$, prior to digitizing. Following the digitizing operation, the IF frequency $f_{IF}$ is typically removed by means of digital signal processing methods. Other variations on the signal processing should be apparent to those skilled in the art.

In assisted GPS systems, a predicted Doppler correction for all GPS signals may be transmitted (in one form or another) from a PDE to the GPS receiver, and a list of the GPS satellites that may be in-view is also sent to the receiver so that the GPS receiver can more efficiently search for satellite signals. A predicted data stream can also be provided by the PDE.

At 62, the data sequence is optionally removed. Although optional, removal of the data sequences d(t) before processing can be very useful. To assist in data sequence removal, in some assisted GPS systems the predicted data sequences d(t) are sent (e.g., from a server) to the GPS receiver, together with some approximate times-of-arrivals of the GPS signals. In these cases, the GPS receiver can remove the data sequence d(t) and hence remove the pseudo-random polarity inversions that may occur every twenty milliseconds in the signal of equation (A1) due to the data sequence d(t). By removing the random polarity inversions (i.e., by removing d(t)), the coherent processing time can be increased to longer time intervals, for example greater than 100 milliseconds, which can improve the sensitivity of the GPS acquisition process. As indicated previously, some future modes of GPS may contain signaling components containing no data.

Also at 62, the processed GPS signal is digitized (i.e., sampled) over a predetermined time period in the analog-to-digital converter (if it has not been previously converted), and then stored in the buffer memory in the GPS receiver. There is no theoretical restriction on the size of the data set, or the sample rate of the data, although it is sometimes beneficial that the data set size be a power of two.

Provide Data Block (33)

At 63, a data block for coherent processing is defined by selecting a sample time period $T_c$ corresponding to a portion of the digital data (e.g., raw or processed data) over a predetermined coherent processing period $T_c$. The time period over which the data is combined for coherent processing is typically chosen to include a significant, integral number of PN frames (e.g., 100 PN frames); advantageously, the length of the time period (the coherence length) can be made longer than conventional systems due to the hypothesized frequency drift. Still, the coherent processing block should not be chosen to be too long; particularly, it may be disadvantageous to try to coherently process very large blocks (e.g., 2- or 3-second blocks) since the unpredictable frequency variations over that long time period may restrict or prevent any improvement in performance.

Referring briefly to FIG. 3, the positioning signal is observed over a time $T_c$, which defines a data block such as a first data block 39a or a second data block 39b, and the time $T_c$ is chosen so that the data block has an integral number of PN frames 35. It may be noticed that, because the actual data block is received without prior knowledge of when the PN frame begins, the beginning and end of the data block can lie anywhere within a PN frame boundary; for example the data block may, by coincidence, extend from the beginning of a first PN frame to the end of a last PN frame as shown at 39a (code phase offset=0), but more likely the data block will extend arbitrarily from somewhere in the middle of a first PN frame to somewhere in the middle of a frame following the last full PN frame (as shown at 39b), so that the code phase offset is not equal to zero.

Hypothesize Frequency Drift (64)

At 64, a hypothesis as to the frequency drift (examples of which have been discussed with reference to FIG. 5) is made by any appropriate method, random or based upon previous information. For example an algorithm may be used to select the most likely frequency drift hypothesis, such as linear at 2 Hz/sec. Alternatively, the choice of the most likely frequency drift may be based upon the most recently successful frequency drift, or upon the most common frequency drift, or any other suitable algorithm.

Process Data Block Responsive to Hypothesized Frequency Drift (65)

At 65, the data block and the hypothesized frequency drift are processed, such as by a multiplication operation, to provide a drift-adjusted data signal, which is the data block adjusted for the hypothesized frequency drift. It may be noted that, in other embodiments, the hypothesized frequency drift could be utilized in other places in the algorithm to adjust other quantities; for example the hypothesized frequency drift may be used to adjust the reference code rather than the data. Since the reference code and the data are used together in correlation, the net effect of adjusting the reference code would be similar to the effect of adjusting the data as illustrated herein. In yet another embodiment, the hypothesized frequency drift may be used to adjust the vector basis of the subsequent FFT operation, or to modify the input or output, or both, of the FFT operation. The predicted frequency drift due to the motion of the transmitter/satellite (i.e., satellite Doppler) may be included in the hypothesized frequency drift, or it may be applied separately. In the latter case, the adjustment for the satellite Doppler may be inserted at either the same place in the algorithm as the adjustment for other frequency drifts, or at some other place.

Select Transmitter that May be in View, Provide Reference Code (66)

At 66, a transmitter (e.g., GPS satellite) is selected or determined by any appropriate method. The selection of any particular satellite may be random, or preferably may be based upon any suitable information, such as history or a list provided by the PDE.

Based upon this satellite selection, a reference code is supplied that is indicative of a signal transmitted from the satellite. The reference code may be locally generated or calculated in advance and stored. The reference code may be in any suitable form, for example it may be a time domain signal; alternatively it may be stored as an FFT. These codes are well-known, and it is feasible and practical to pre-compute and store the values for every GPS code in the GPS receiver.

It should be noted that the GPS receiver simultaneously receives a multiplicity of signals, for example, in a typical situation, the GPS receiver typically receives eight to twelve signals from a variety of in-view satellites at any time, but many of those signals may be too weak to detect. Therefore, there is uncertainty as to which satellites are providing a receivable signal, and additionally, even if detectable, the code phase offset of any receivable signal, which determines the time of arrival, is unknown.

As will be discussed, the PN code for the selected satellite will be tested over all frequency hypotheses, at least until a match is found or all hypotheses have been exhausted, and then the next satellite will be selected and tested over all frequency hypotheses, and so on until all candidate satellites have been selected, or until sufficient satellites have been found to complete a location fix.

Hypothesize Initial PR Shift (67)

At 67, an initial hypothesis is made as to the PR shift. If sufficient information is available to the GPS receiver, (e.g., a prior location fix has been made or code phase predictions are available), then this initial hypothesis and subsequent hypotheses may be made based upon this information. If no information is available, then a best guess may be made and searching would begin.

Correlate Drift-Adjusted Signal with Reference Code (68)

At 68, an operation is performed to correlate the drift-adjusted signal with the reference code by any appropriate method. The result is a correlation data set.

For purposes of explanation, the method disclosed above corresponds to processing one block of data in a coherent manner, which is a type of correlation termed herein "coherent integration." In order to improve sensitivity, the magnitude of the correlation outputs from a number of coherent correlation processes may be detected and combined over a number (e.g., 2 to 2000 blocks, typically 5 to 200 blocks) of adjacent time intervals to provide the correlation results. This process is termed "non-coherent integration."

Perform Fourier Transform on Data Block (69)

At 69, the correlation data set is transformed to the frequency domain by using a Fourier transform process, for example to generate a set of frequency samples. This step may be called the "forward transform" process, and can be performed in a variety of ways, such as a fast Fourier transform (FFT). One well-known approach is "decimation in time"; another approach is decimation in frequency. Other fast algorithms may be employed as appropriate or useful, such as chirp z-transforms or number theoretic transforms.

The FFT of an arbitrary signal includes a series of data frequency samples separated in frequency by the reciprocal of the duration of the data block being processed. For example, if the block duration ($T_c$) is 80 milliseconds, the frequency samples are spaced by 12.5 Hz. Each data frequency sample may be identified by its frequency in Hz, or more conveniently, by its frequency index. Particularly each data frequency sample of a DFT can be designated with an integer (the frequency index), which may for example start at zero index for a zero frequency. For an N-point FFT, frequency index N/2 corresponds to a frequency in Hz of one-half the sample rate, i.e., S/2. Frequency samples with index N/2+1, N/2+2, etc., correspond to frequencies in Hz equal to $-S/2+1/T_c$, $-S/2+2/T_c$, etc.; that is, they represent data corresponding to negative frequencies.

Search FFT Correlation Results for Match (70)

At 70, the FFT correlation results from step 69 are analyzed to determine if a match has been found. This operation can be performed in any of a number of suitable algorithms, such as described below. Particularly, the FFT result is a series of lines at distinct frequencies, spaced apart equally. In order to determine whether or not a match has been found, any suitable search algorithm may be employed. Typically, the magnitude of each line is calculated (detected). If the magnitude of the line for an FFT frequency index and a particular hypothesized code phase is the largest of all the lines, and its amplitude meets or exceeds a predetermined threshold, then it may be assumed that a match has been found.

At 71, a test is performed. If a match has not been identified, then the operation moves to a decision 72. At 72, if there are more PR shifts to be searched, then another PR shift hypothesis is made at step 73, and then operation continues in the "phase loop", which includes steps 68-71. However, if there are no more PR shifts to be searched, then operation moves out of the phase loop, from 72 to decision 74, which determines if more frequency drift hypotheses are to be tested.

From decision 74, if there are more frequency drift hypotheses to be tested, then the operation continues in the "frequency drift loop", which includes steps 64-72, to hypothesize another frequency drift for the same transmitter. If there are no more frequency drift hypotheses to be tested, then operation moves to the decision 76, discussed below, which determines if there are more satellite/transmitters to search.

Returning to the decision at step 71, if a match has been found, then operation moves to step 75 where the code phase offset is determined.

Determining Code Phase Offset (75)

As discussed above, when the data was sampled, the code phase was not known; i.e., the beginning and end of a PN frame period have not yet been ascertained. Particularly, although the data block has an integral number of PN frames, the starting position of the data block is unknown, and therefore the beginning and end of the data block can lie anywhere within the PN frame. For example, as shown in FIG. 3, the data block may, by coincidence, extend from the beginning of the first PN frame to the end of the last PN frame as shown at 39a (code phase offset=0), but more likely the data block will extend from an arbitrary point within the first PN frame as shown at 69b, to the same point within the frame following the last full PN frame (code phase offset≠0).

At 75, following a positive search result (i.e., after a match has been found in step 71), the code phase offset is determined from the hypothesized PR shift used at 68, while the average frequency offset is determined from the FFT correlation results of step 69. The precise code phase offset is usually interpolated from correlation results corresponding to a few PR shifts around the peak found in the search. If the consecutive PR shift hypotheses are no more than one-half PN chips apart, then such interpolation is possible.

At 76, a decision is made as to whether or not additional transmitter/satellites are to be searched. This decision is made in accordance with any suitable criteria; for example, if sufficient satellites have already been found to make a location fix, or if the list of possible in-view satellites has been exhausted, then a decision may be made to stop searching and therefore, as indicated at 77, the acquisition operation is complete. However, if more satellites are to be searched, then at operation returns to step 66 and the transmitter loop is performed to select the next satellite, hypothesize another PR shift, and steps 66-76 are performed with the new assumptions.

Summary and Additional Discussion

The method of FIG. 6 corresponds to processing one block of data in a coherent manner, which is a type of correlation termed herein "coherent integration." In actual practice, however, coherent integration may not result in sufficient sensitivity to detect a weak GPS signal and measure its code phase because the length of the coherent integration period is limited by various frequency errors. In order to improve sensitivity, the magnitude of the correlation outputs from a number of coherent correlation processes may be detected and combined, which is termed "non-coherent integration". Particularly, the coherent processes may be repeated for one or more additional, adjacent time intervals (e.g., 2 to 2000 blocks, typically 5 to 200 blocks), and then the results are detected (e.g., their magnitude or magnitude-squared is calculated) and combined. The summation of these detected correlation sample blocks is termed noncoherent or incoherent processing. Non-coherent processing gives lesser sensitivity than coherent processing for the same total integration length. By applying frequency drift hypotheses in the signal processing, the length of coherent integration can be increased at the expense of reducing the length of incoherent integration while keeping the total integration length the same, the net effect of which is an increase in signal detection sensitivity.

It will be appreciated by those skilled in the art, in view of these teachings, that alternative embodiments may be implemented without deviating from the spirit or scope of the invention.

Figure 7:
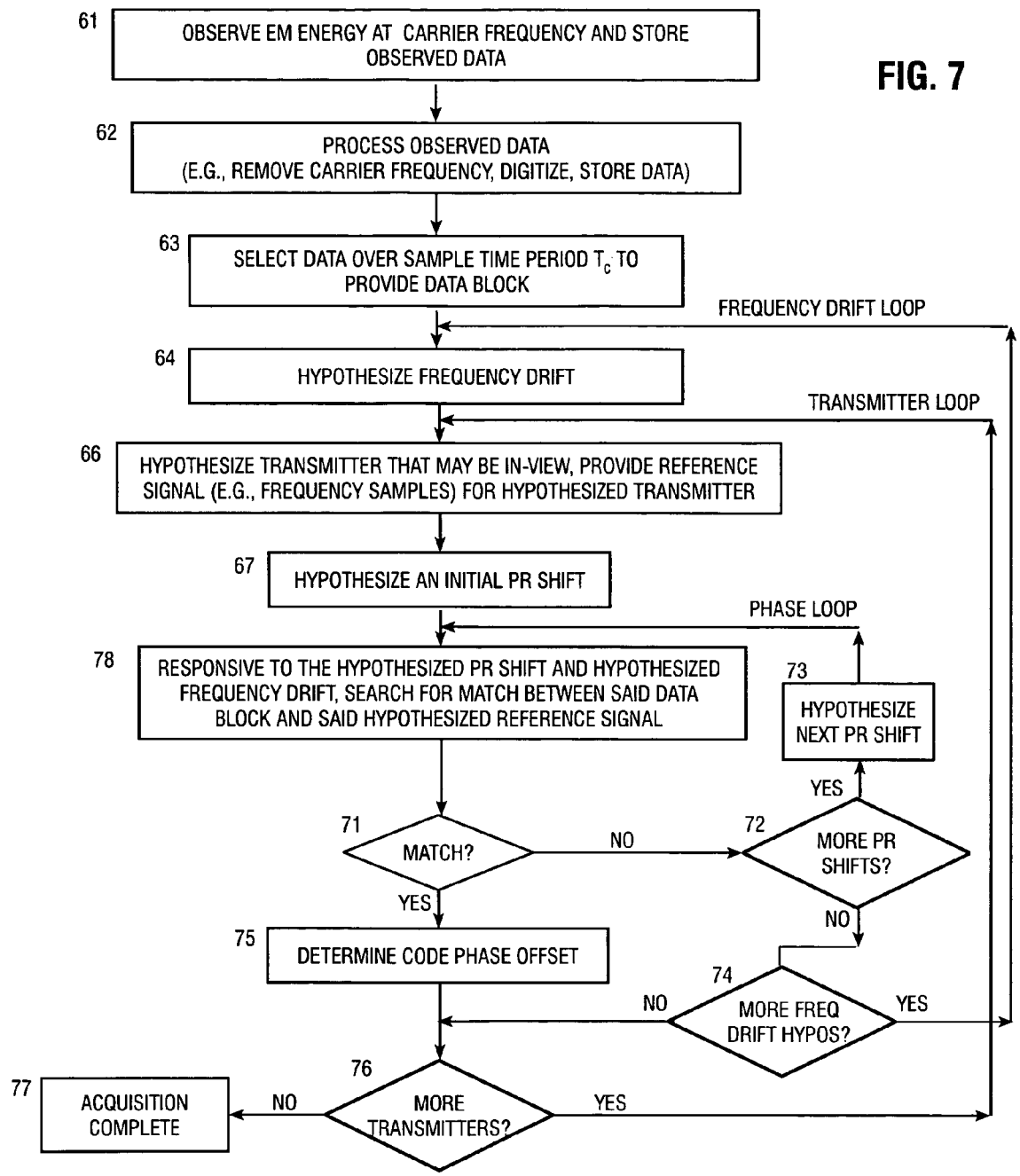
FIG. 7 is a flow chart of a method for receiving a positioning signal responsive to a hypothesized frequency drift.

FIG. 7 is a flow chart that includes alternative embodiments for receiving a positioning signal. Particularly, the steps in blocks 61-64, 66, 67, and 71-77 correspond to those described above with reference to FIG. 6.

At 78, an operation is shown to search for a match between the data block and the hypothesized reference signal, responsive to the hypothesized PR shift and hypothesized frequency drift. The operations at 78 may include the system described above with reference to FIG. 6 in which the data block is processed responsive to the hypothesized frequency drift to provide a drift-adjusted data signal, followed by searching for a match between said drift-adjusted data block and said hypothesized reference signal.

Alternatively, at 78 the operation may include processing the hypothesized reference signal responsive to said hypothesized frequency drift to provide a drift-adjusted reference signal, and searching for a match between said data block and said hypothesized reference signal.

Generally, the operations at 78 may be performed using any suitable sequence of hypothesizing the frequency drift, the frequency, and the phase shift. Many alternatives are suitable; for example multiple hypotheses of frequency drifts may be tested in parallel, or a single phase shift hypothesis may be tested for multiple frequency drift hypotheses, or a number of different hypothesis of different types may be tested in parallel.

In still another alternative, the operation at 78 may include calculating frequency samples responsive to the data block, calculating frequency samples responsive to said reference signal; and searching for a match between the data block and thereference signal frequency samples. The vector basis of at least one of the Fourier-transformed data block and the periodically-repeating sequence may be adjusted responsive to said hypothesized frequency drift.

This invention is to be limited only by the following claims, which include all such embodiments and modifications when viewed in conjunction with the above specification and accompanying drawings.

What is claimed is:

1. A method of using a long coherent integration period to receive a positioning signal transmitted from one of a plurality of transmitters at a predetermined carrier frequency, the positioning signal including a reference signal that uniquely identifies the transmitter that sent the positioning signal, comprising:
- a) observing electromagnetic energy at about said carrier frequency, and providing data responsive to said observed electromagnetic energy;
- b) hypothesizing one of said transmitters, thereby hypothesizing one of said plurality of unique reference signals;
- c) hypothesizing a frequency drift, wherein the frequency drift changes according to a lapse in time;
- d) processing, using a processor, said data responsive to said hypothesized frequency drift;
- e) defining a data block of said data;
- f) searching for a match between said data block and said hypothesized unique reference signal; and
- g) if a matched signal is found, then determining phase delay and timing information, otherwise looping through said steps b through f until a matched signal is found or until a predetermined exit criteria has been met.

2. The method of claim 1 wherein said hypothesized frequency drift is approximately linear.

3. The method of claim 1 wherein said hypothesized frequency drift is approximately exponential.

4. The method of claim 1 wherein said step f comprises:
processing said data block responsive to said hypothesized frequency drift to provide a drift-adjusted data signal; and
searching for a match between said drift-adjusted data block and said hypothesized unique reference signal over a plurality of phase shifts.

5. The method of claim 1 wherein said step f comprises:
processing said hypothesized unique reference signal responsive to said hypothesized frequency drift to provide a drift-adjusted reference signal; and
searching for a match between said data block and said hypothesized unique reference signal over a plurality of phase shifts.

6. The method of claim 1, wherein said step f comprises:
calculating frequency samples responsive to said data block;
calculating frequency samples responsive to said reference signal; and
searching for a match between said data block frequency samples and said reference signal frequency samples.

7. The method of claim 6 wherein said step further comprises adjusting the vector basis of said data block frequency samples and said periodically repeating sequence responsive to said hypothesized frequency drift.

8. The method of claim 1 wherein said transmitters comprise a plurality of Global Positioning System (GPS) satellites that transmit GPS signals at a GPS frequency, each GPS satellite transmitting a unique reference signal.

9. The method of claim 1 wherein said data block has a size that corresponds to an integral number of repetitions of said reference signals.

10. The method of claim 1 wherein said data block has a size within a range of one hundred to five hundred repetitions of said reference signals.

11. The method of claim 1, wherein the hypothesized frequency drift corresponds to an estimation of non-constant frequency error over the long coherent integration period.

12. A method of using a long coherent integration period to receive a positioning signal transmitted from one of a plurality of transmitters at a predetermined carrier frequency, the positioning signal including a periodically-repeating sequence that uniquely identifies the transmitter that sent the positioning signal, comprising:
- a) observing electromagnetic energy at about said carrier frequency, and storing data indicative of said observed electromagnetic energy;
- b) defining a data block that may be subject to an unknown frequency drift, wherein the frequency drift changes according to a lapse in time;
- c) hypothesizing a frequency drift over said data block;
- d) processing, using a processor, said data responsive to said hypothesized frequency drift to provide a drift-adjusted signal;
- e) applying said drift-adjusted signal to a correlation system, and searching for a match between said drift-adjusted signal and at least one of said plurality of transmitters; and
- f) if a matched signal is found, then determining phase delay and timing information, otherwise looping through said steps c through e until a matched signal is found or until a predetermined exit criteria has been met.

13. The method of claim 11 wherein said hypothesized frequency drift is approximately linear.

14. The method of claim 11 wherein said hypothesized frequency drift is approximately exponential.

15. The method of claim 11 wherein said step e comprises:
hypothesizing one of said plurality of transmitters and providing a reference code corresponding to said hypothesized transmitter;
assuming a pilot reference (PR) shift
correlating said drift-adjusted signal and said reference code responsive to said PR shift, thereby providing a correlation data set; and searching said correlation data set to identify a signal match.

16. The method of claim 14 wherein said reference code comprises a time domain signal.

17. The method of claim 11 wherein said transmitters comprise a plurality of Global Positioning System (GPS) satellites that transmit GPS signals at a GPS frequency, each GPS satellite transmitting a unique periodically-repeating sequence.

18. The method of claim 11 wherein said data block has a size that corresponds to an integral number of repetitions of said periodically-repeating sequences.

19. The method of claim 11 wherein said data block has a size within a range of one hundred to five hundred repetitions of said periodically-repeating sequences.

20. The method of claim 11 further comprising utilizing said timing information to determine a position of said mobile station.

21. The method of claim 11 wherein said data block corresponds to a time period between ten milliseconds and 1 second.

22. A receiver that uses a long coherent integration period to receive a positioning signal transmitted from one of a plurality of transmitters at a predetermined carrier frequency, the positioning signal including a reference signal that uniquely identifies the transmitter that sent the positioning signal, comprising:
means for observing electromagnetic energy at about said carrier frequency, including an antenna;
means for storing data indicative of said observed electromagnetic energy over a predefined period of time;
means for hypothesizing one of said transmitters, thereby hypothesizing one of said plurality of unique reference signals;
means for hypothesizing a frequency drift, wherein the frequency drift changes according to a lapse in time;
means, for defining a data block responsive to said data, and searching for a match between said data block and said hypothesized unique reference signal over a plurality of phase shifts, responsive to said hypothesized frequency drift;

means for determining phase delay and timing information; and control means for determining when a matched signal has been found.

23. The receiver of claim 21 wherein said hypothesized frequency drift is approximately linear.

24. The receiver of claim 21 wherein said hypothesized frequency drift is approximately exponential.

25. The receiver of claim 21 further comprising:
means for processing said data block responsive to said hypothesized frequency drift to provide a drift-adjusted data signal; and
means for searching for a match between said drift-adjusted data block and said hypothesized unique reference signal.

26. The receiver of claim 21 further comprising:
means for processing said hypothesized unique reference signal responsive to said hypothesized frequency drift to provide a drift-adjusted reference signal; and
means for searching for a match between said data block and said hypothesized reference signal.

27. The receiver of claim 21, further comprising:
means for calculating frequency samples responsive to said data block;
means for frequency samples responsive to said reference signal; and
means for searching for a match between said Fourier-transformed data block and said Fourier-transformed reference signal.

28. The receiver of claim 26 further comprising means for adjusting the vector basis of said data block frequency samples and said periodically repeating sequence responsive to said hypothesized frequency drift.

29. The receiver of claim 21 wherein said transmitters comprise a plurality of Global Positioning System (GPS) satellites that transmit GPS signals at a GPS frequency, each GPS satellite transmitting a unique reference signal.

30. The receiver of claim 21 wherein said data block has a size that corresponds to an integral number of repetitions of said reference signals.

31. The receiver of claim 21 wherein said data block corresponds to a time period between ten milliseconds and 1 second.

32. A mobile station that uses a long coherent integration period to receive a positioning signal transmitted from one of a plurality of transmitters at a predetermined carrier frequency, the positioning signal including a reference signal that uniquely identifies the transmitter that sent the positioning signal, comprising:
a position location system configured to observe electromagnetic energy at about said carrier frequency, including an antenna;
a mobile device control system configured to store data indicative of said observed electromagnetic energy over a predefined period of time, to hypothesize one of said transmitters, thereby hypothesizing one of said plurality of unique reference signals, to hypothesize a frequency drift according to a lapse in time, to define a data block responsive to said data, to search for a match between said data block and said hypothesized unique reference signal over a plurality of phase shifts, responsive to said hypothesized frequency drift, to determine phase delay and timing information and
to determine when a matched signal has been found.

33. A non-transitory computer-readable medium having computer-executable instructions for performing a method of using a long coherent integration period to receive a positioning signal transmitted from one of a plurality of transmitters at a predetermined carrier frequency, the positioning signal including a reference signal that uniquely identifies the transmitter that sent the positioning signal, comprising:
observing electromagnetic energy at about said carrier frequency, and providing data responsive to said observed electromagnetic energy;
hypothesizing one of said transmitters, thereby hypothesizing one of said plurality of unique reference signals;
hypothesizing a frequency drift, wherein the frequency drift changes according to a lapse of time;
processing said data responsive to said hypothesized frequency drift; defining a data block of said data;
searching for a match between said data block and said hypothesized reference signal; and
if a matched signal is found, then determining phase delay and timing information, otherwise looping through said steps b through f until a matched signal is found or until predetermined exit criteria has been met.

34. The non-transitory computer-readable medium of claim 33 wherein the computer-executable instructions provide for:
processing said data block responsive to said hypothesized frequency drift to provide a drift-adjusted data signal; and
searching for a match between said drift-adjusted data block and said hypothesized reference signal over a plurality of phase shifts.

35. The non-transitory computer-readable medium of claim 33 wherein the computer-executable instructions provide for:
processing said hypothesized reference signal responsive to said hypothesized frequency drift to provide a drift-adjusted reference signal; and
searching for a match between said data block and said hypothesized reference signal over a plurality of phase shifts.

36. The non-transitory computer-readable medium of claim 33 wherein the computer-executable instructions provide for:
calculating frequency samples responsive to said data block;
calculating frequency samples responsive to said reference signal;
searching for a match between said data block frequency samples and said reference signal frequency samples; and
adjusting the vector basis of said data block frequency samples and said periodically repeating sequence responsive to said hypothesized frequency drift.

* * * * *